United States Patent
Walker et al.

(10) Patent No.: US 6,230,150 B1
(45) Date of Patent: May 8, 2001

(54) VENDING MACHINE EVALUATION NETWORK

(75) Inventors: Jay S. Walker, Ridgefield; Daniel E. Tedesco; James A. Jorasch, both of Stamford, all of CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/052,093

(22) Filed: Mar. 31, 1998

Related U.S. Application Data

(63) Continuation-in-part of application No. 08/947,798, filed on Oct. 9, 1997.

(51) Int. Cl.⁷ .................................................. G06F 17/60
(52) U.S. Cl. ............................ 705/400; 700/90; 700/231; 700/238; 700/241; 705/1; 705/10; 705/30
(58) Field of Search ............................ 700/90, 213, 231, 700/236, 241, 238; 705/1, 10, 16, 22, 30, 400; 709/217, 218, 219

(56) References Cited

U.S. PATENT DOCUMENTS

| | | | |
|---|---|---|---|
| 4,008,792 | 2/1977 | Levasseur et al. | 194/1 N |
| 4,237,537 | 12/1980 | Pitches et al. | 364/465 |
| 4,245,730 | 1/1981 | Bachmann et al. | 194/1 A |
| 4,282,575 | 8/1981 | Hoskinson et al. | 364/479 |
| 4,412,292 | 10/1983 | Sedam et al. | 364/479 |
| 4,498,570 | 2/1985 | King et al. | 194/1 N |
| 4,593,361 | 6/1986 | Otten | 364/479 |
| 4,654,800 | 3/1987 | Hayashi et al. | 364/479 |
| 4,679,150 | 7/1987 | Hayashi et al. | 364/479 |
| 4,766,548 | 8/1988 | Cedrone et al. | 364/479 |
| 4,981,027 | 1/1991 | Friedman et al. | 70/358 |

(List continued on next page.)

FOREIGN PATENT DOCUMENTS

| | | |
|---|---|---|
| 612024 * | 6/1979 | (CH) . |
| 4037689 | 6/1992 | (DE) . |
| 0 817 138 A1 | 1/1998 | (EP) . |
| 5266326 | 10/1993 | (JP) . |
| 814745 | 6/1996 | (JP) . |
| 9-16836 * | 1/1997 | (JP) . |
| 9502496 | 3/1995 | (KR) . |
| WO 9636023 | 11/1996 | (WO) . |

OTHER PUBLICATIONS

Atsushi Nakayama, "Coca–Cola Machines to be 'Smarter'", The Japan Economic Journal, Feb. 23, 1991 at p. 22.

(List continued on next page.)

*Primary Examiner*—Edward R. Cosimano
(74) *Attorney, Agent, or Firm*—Steven M. Santisi

(57) ABSTRACT

Methods and apparatus are disclosed for automatically testing, monitoring and managing the pricing and other sales information associated with products sold by vending machines. A price or other sales information associated with a product is initially adjusted at one or more initial vending machines, before automatically and progressively expanding the new price or other sales information to additional vending machines, upon verification of a successful change. Successful test results are thus automatically propagated to additional vending machines for further testing in the market. The sales information that can be tested includes price, product placement instructions, new advertising or promotional instructions, and packaging instructions for the sale of a group of products at a single price. Vending machines can thus be configured in progressive "layers" of vending machines so that adjustments to price or other sales information can be initially evaluated by one or more vending machines in a small group, before progressively expanding the new price or other sales information to one or more additional vending machines.

99 Claims, 12 Drawing Sheets

U.S. PATENT DOCUMENTS

| | | | |
|---|---|---|---|
| 5,091,713 | 2/1992 | Horne et al. | 340/541 |
| 5,159,560 | 10/1992 | Newell et al. | 364/479 |
| 5,257,179 | 10/1993 | DeMar | 364/410 |
| 5,267,452 | 12/1993 | Zinsmeyer et al. | 62/505 |
| 5,339,250 | 8/1994 | Durbin | 364/479 |
| 5,367,452 | 11/1994 | Gallery et al. | 364/401 |
| 5,450,938 | 9/1995 | Rademacher | 194/206 |
| 5,452,344 | 9/1995 | Larson | 379/107 |
| 5,613,620 | 3/1997 | Center et al. | 221/133 |
| 5,701,252 | 12/1997 | Facchin et al. | 364/479 |
| 5,822,736 | 10/1998 | Hartman et al. | 705/1 |
| 5,930,771 * | 7/1999 | Stapp | 705/28 |
| 5,988,346 * | 11/1999 | Tedesco et al. | 194/217 |
| 5,997,928 | 12/1999 | Kaish et al. | 426/418 |
| 6,012,834 | 1/2000 | Dueck et al. | 364/479.08 |
| 6,021,394 | 2/2000 | Takahashi | 705/10 |

OTHER PUBLICATIONS

"Software Opens Doors to Scientific Machine Menuing", Automatic Merchandiser, Feb., 1996 at p. 36.

Carol Steinberg, "Rising Stars: The Hottest New Franchise Companies; Nine Companies Profiled", Success, Jun., 1996, No. 5, vol. 43 at p. 76.

James Niccolai, "Vending Machines To Stay Stocked, Thanks to SAP, Digital", InfoWorld, Oct. 27, 1997 Internet & I–Commerce at p. 84.

Andrew Craig, "SAP, Digital Try to Eliminate Empty Vending Machines", InternetWeek, Nov. 3, 1997, Telepath Section at p. T27.

"Windows for Vending: Reports", Vendmaster, download date: Feb. 6, 1998.

"Windows for Vending PRO with Inventory", Vendmaster, download date: Mar. 16, 1998.

"Windows for Vending PRO", Vendmaster, download date: Mar. 16, 1998.

Skywire Software Information Page, download date: Mar. 26, 1998.

Windows for Vending by Vendmaster, download date: Feb. 6, 1998.

Allan Z. Gilbert, "A Call to Action for Wireless Communication", Automatic Merchandiser, Aug. 1996 at pp. 62–64.

David Hirschfeld, "Increasing Profits Through Automation", Independent Vendors Association Quarterly, Apr. 1997.

* cited by examiner

| MACHINE/ SLOT IDENTIFIER 530 | PRICE ALTERATION FACTOR 535 | TEST START DATE 540 | TRIAL PERIOD DURATION 545 | SUCCESS DETERMINATION CRITERIA 550 | TRIAL PERIOD PROFITABILITY CHANGE 555 |
|---|---|---|---|---|---|
| DIGIVEND.COM/ MACHINE 1/SLOT 1 | +$0.05 | 3/1/98 | 7 DAYS | > 0.5% PROFITABILITY CHANGE | +15% |
| DIGIVEND.COM/ MACHINE 1/SLOT 2 | +3% | -- | 7 DAYS | > 0.5% PROFITABILITY CHANGE | -- |
| DIGIVEND.COM/ MACHINE 1/SLOT 3 | -- | -- | 7 DAYS | > 0.5% PROFITABILITY CHANGE | -- |
| DIGIVEND.COM/ MACHINE 2/SLOT 1 | +$0.05 | 3/7/98 | 7 DAYS | > 0.5% PROFITABILITY CHANGE | -3% |
| DIGIVEND.COM/ MACHINE 3/SLOT 1 | +$0.05 | 3/7/98 | 7 DAYS | > 0.5% PROFITABILITY CHANGE | +1.01% |
| DIGIVEND.COM/ MACHINE 5/SLOT 1 | +$0.05 | 3/14/98 | 7 DAYS | > 0.5% PROFITABILITY CHANGE | TBD |
| DIGIVEND.COM/ MACHINE 1/ SLOT 1 | -- | n/a | 7 DAYS | > 0.5% PROFITABILITY CHANGE | -- |
| DIGIVEND.COM/ MACHINE 6/SLOT 2 | -- | n/a | 7 DAYS | > 0.5% PROFITABILITY CHANGE | -- |
| DIGIVEND.COM/ MACHINE 7/SLOT 1 | +$0.05 | 3/14/98 | 7 DAYS | > 0.5% PROFITABILITY CHANGE | TBD |
| DIGIVEND.COM/ MACHINE 8/SLOT 1 | +$0.05 | 3/14/98 | 7 DAYS | > 0.5% PROFITABILITY CHANGE | TBD |

FIG. 5A 600 (DIGIVEND.COM/MACHINE 07)

| SLOT IDENTIFIER 620 | AVAILABLE INVENTORY 625 | UNIT COST 630 | PREVIOUS ITEM PRICE 635 | QUANTITY SOLD AT PREVIOUS ITEM PRICE 640 |
|---|---|---|---|---|
| I01 | 06 | $0.35 | $0.50 | 11 |
| I02 | 02 | $0.25 | $0.50 | 10 |

| PROFITABILITY AT PREVIOUS ITEM PRICE 645 | TEST/CURRENT ITEM PRICE 650 | QUANTITY SOLD AT TEST/CURRENT ITEM PRICE 655 | PROFITABILITY AT TEST/CURRENT ITEM PRICE 660 | CHANGE IN PROFITABILITY 665 |
|---|---|---|---|---|
| $1.65 | $0.55 | TBD | TBD | TBD |
| $2.50 | $0.50 | TBD | TBD | TBD |

FIG. 6B

VENDING MACHINE EVALUATION NETWORK

CROSS-REFERENCE TO RELATED APPLICATION

This application is a continuation-in-part of U.S. patent application Ser. No. 08/947,798, filed Oct. 9, 1997, incorporated by reference herein.

FIELD OF THE INVENTION

The present invention relates generally to vending machines, and more particularly, to a method and system for dynamically testing, monitoring and managing the pricing and other sales information associated with products in vending machines.

BACKGROUND OF THE INVENTION

Vending machines are well known devices employed at various locations to store and dispense a vast array of merchandise, including beverages, snacks, video tapes and children's toys, in response to a customer request and appropriate payment. Vending machines provide numerous benefits to customers and operators alike. Vending machines typically provide customers with the convenience of self-service and twenty four-hour access. Likewise, operators benefit from the ability of vending machines to make automated sales of merchandise to customers, often at unconventional locations and times of day, without substantial labor costs.

Although the basic advantages of vending machines are significant and well known, prior art vending machines have several significant disadvantages when compared to traditional retail merchandising, particularly relating to inventory control and pricing. A number of solutions have been proposed or suggested to address vending machine inventory control and pricing problems, including methods for determining what products are the best sellers, and the appropriate times and quantities for re-stocking vending machine items. The solutions include methods and systems that enable vending machine operators to remotely monitor inventory and remotely retrieve sales data.

The aforementioned solutions generally attempt to solve inventory problems by allowing operators to monitor and analyze raw sales data. Once the operators have analyzed the available sales data to make pricing decisions, however, the operators must then manually ratify and implement the decisions. In addition to being time consuming and burdensome, such manual processes are largely arbitrary and are not dynamically responsive to real-time market pressures. Furthermore, the implementation of any resulting price changes are delayed until the operator analyzes the raw supply and demand data, arrives at a pricing decision, and ultimately posts the pricing decision.

Accordingly, the current methods of implementing new pricing decisions are inconsistent with the fundamental benefits of automated merchandising afforded by vending machines. Pricing decisions in a vending machine operation cannot currently be made as easily as they may be, for example, in the retail environment where humans are physically present to monitor supply and demand and adjust prices accordingly.

A number of vending machine innovations have eased the management burden of vending machines by using existing network technology to interconnect vending machines. Such networking allows vending machine operators to remotely access inventory data in order to make re-stocking and marketing decisions. For example, U.S. Pat. No. 4,412,292, to Sedam et al., entitled "System for the Remote Monitoring of Vending Machines," (hereinafter, the "'292 Patent") discloses a system for remote monitoring of vending machines and for communicating conditions at the remote vending machine to a central controller. The system disclosed in the '292 Patent aids in inventory control and route planning for the supply and maintenance of the vending machines. In addition, the Vendview vending machine management product, commercially available from Skywire Corp. of Memphis, Tenn., is a remote vending machine monitoring system that provides vending operators with actual sales figures, the amount of cash that was collected by the vending machine since it was last serviced, and a notification of alarm conditions, such as restocking and service requirements. Again, the implementation of any resulting price changes with these innovations are delayed until the operator analyzes the available data, arrives at a pricing decision, and ultimately posts the pricing decision.

The parent application to the present application discloses a "Method and Apparatus For Dynamically Managing Vending Machine Inventory Prices" that enables the automatic price adjustment of vending machine items in an efficient manner, with respect to real-time determinations of sales and market data. However, if the price adjustment is determined to be successful for a given vending machine, there is currently no efficient way to propagate that price to similar vending machines with similar products.

As apparent from the above deficiencies with conventional vending machine systems, a need exists for a method and apparatus that dynamically and automatically tests, monitors and manages the pricing and other sales information associated with products sold by vending machines. A further need exists for a method and apparatus that initially adjusts and evaluates the price or other sales information associated with a product at one or more vending machines in a first group, and then progressively expands the new price or other sales information to one or more additional vending machines, upon verification of a successful change.

SUMMARY OF THE INVENTION

Generally, according to one aspect of the invention, a method and apparatus are disclosed for automatically testing, monitoring and managing the pricing and other sales information associated with products sold by vending machines. A central server initially adjusts and evaluates the price or other sales information associated with a product at one or more initial vending machines, before progressively expanding the new price or other sales information to additional vending machines, upon verification of a successful change. Thus, the present invention permits successful test results to be automatically propagated to additional vending machines for further testing in the market. The sales information that can be tested includes price, product placement instructions, new advertising or promotional instructions, and packaging instructions for the sale of a group of products at a single price.

In an illustrative price adjustment embodiment, the central server initially adjusts the price of a product at a first vending machine, in order to evaluate a price adjustment. After the price adjustment has been in place for a predefined trial period, the success of the price adjustment is evaluated to determine if the test should be expanded beyond the initial vending machine. The evaluation may be performed locally, for example, by one or more individual vending machines, or remotely, for example, by a central server. Depending on the performance of the price adjustment for the trial period, the price adjustment may be imposed on the same or a similar product in one or more additional vending machines. After the price adjustment has been in place with the second group of vending machines for a further predefined trial period, the price adjustment performance is further evaluated to determine if the price adjustment should be applied to even more vending machines during subsequent trial periods.

According to a further aspect of the invention, vending machines can be configured in progressive "layers" of vending machines so that adjustments to price or other sales information can be initially evaluated by one or more vending machines in a small group, before progressively expanding the new price or other sales information to one or more additional vending machines. In one embodiment, a successful adjustment to a price or other sales information at one vending machine will be automatically propagated to a predefined set of additional vending machines. The predefined set of additional vending machines associated with a given vending machine may be indicated, for example, in a database record associated with each vending machine. Thereafter, if the adjustment to the price or other sales information is successful at one or more of the predefined set of additional vending machines, the adjustment will be automatically propagated from each successful vending machine to a further layer of predefined additional vending machines.

A more complete understanding of the present invention, as well as further features and advantages of the present invention, will be obtained by reference to the following detailed description and drawings.

BRIEF DESCRIPTION OF THE DRAWINGS

FIGS. 5A and 5B, collectively, illustrate a sample table from the price testing database of FIG. 3;

FIGS. 6A and 6B illustrate sample tables from the inventory database of FIG. 4 for two vending machines of FIG. 1.

DETAILED DESCRIPTION

Figure 1:
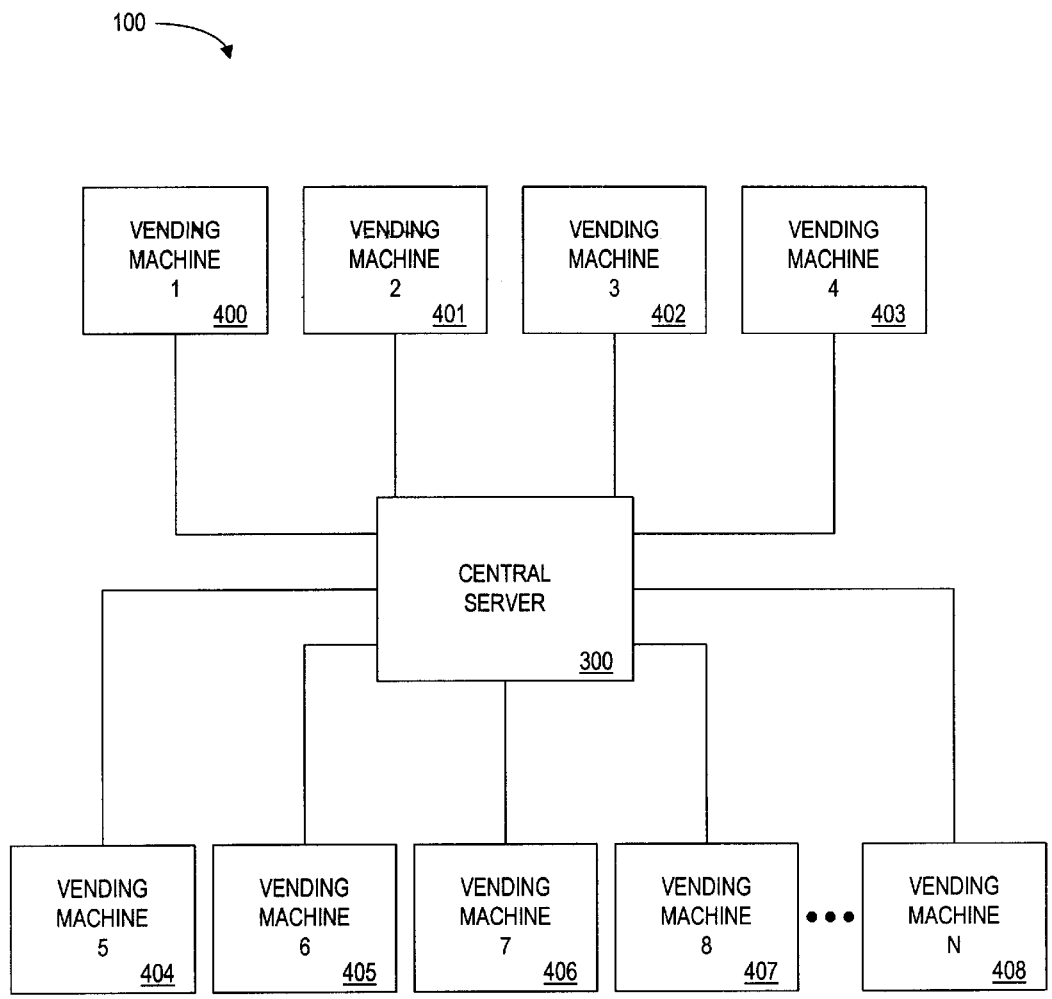
FIG. 1 is a schematic block diagram illustrating a network environment for interconnecting a plurality of vending machines and a central server.

FIG. 1 illustrates a network environment 100 for transferring information between one or more vending machines 400–408, such as a representative vending machine 400 discussed below in conjunction with FIG. 4, and a central server 300, discussed below in conjunction with FIG. 3. According to a feature of the present invention, the central server 300 automatically tests, monitors and manages the pricing and other sales information of products in the vending machines 400–408. According to a further feature of the invention, the central server 300 initially adjusts and evaluates the price or other sales information associated with a product at a first vending machine 400, before progressively expanding the new price or other sales information to one or more additional vending machines 401–408 upon verification of a successful change. In this manner, the successful test results are propagated to additional vending machines for further testing in the market.

As used herein, the term "vending machine" refers to any automatic sales machine that allows payment to be exchanged for goods or services, including snack machines, beverage machines, automatic teller machines (ATMs), postage stamp dispensers, parking meters, electronic highway toll booths that deduct a toll charge from a motorist's pre-paid account or credit card, arcade games, slot machines and laundry machines. When implemented in an ATM, the present invention would function, for example, to test new surcharge fees at the remote ATMs. The central server 300 and vending machines 400–408, discussed further below in conjunction with FIGS. 3 and 4, respectively, may be embodied as conventional hardware and software, as modified herein to carry out the functions and operations described below. The vending machines 400–408 and the central server 300 transmit data between one another, including price and inventory information, price adjustment instructions and price adjustment evaluation information. The vending machines 400–408 and central server 300 may communicate by means of any appropriate cable or wireless links (or both) on which data signals can propagate, including the Internet, the public switched telephone network ("PSTN") and power lines.

According to a further feature of the invention, sales information other than price can be tested, monitored and managed by the central server 300. As used herein, the term "sales information" refers to any information that can be adjusted by a vending machine to affect product sales, typically with the goal of increasing overall vending machine revenue or increasing use of the vending machine. Although the central server 300 is primarily illustrated herein as a system for testing, monitoring, and managing the pricing of products in vending machines 400–408, the central server 300 could be utilized to adjust and evaluate any sales information, as would be apparent to a person of ordinary skill. For example, the central server 300 may initially adjust product placement instructions of one or more products at a first vending machine 400 in order to evaluate shelf space arrangements, before expanding the new positioning configuration beyond the initial vending machine 400. Likewise, the central server 300 may initially adjust new advertising or promotional instructions for one or more products at a first vending machine 400 in order to evaluate the effect on product sales, before expanding the new advertising beyond the initial vending machine 400.

In addition, the central server 300 may initially adjust packaging instructions for the sale of a group of products at a single price at a first vending machine 400 in order to evaluate the success of the package configuration, before expanding the new packaging configuration beyond the initial vending machine 400. For a detailed discussion of a suitable vending machine 400 for the sale of packages of products, see U.S. patent application Ser. No. 09/012,163, entitled "Method and Apparatus for Automatically Vending a Combination of Products," filed Jan. 22, 1998, incorporated by reference herein. In addition, the central server 300 may initially adjust instructions for the subscription sale of one or more products at a first vending machine 400 in order to evaluate the success of the subscription configuration, before expanding the new subscription configuration beyond the initial vending machine 400. For a detailed discussion of a suitable vending machine 400 for the sale of packages of products, see U.S. patent application Ser. No. 08/966,608, entitled "Method and Apparatus for Establishing and Managing Vending Machine Subscriptions," filed Nov. 10, 1997, now U.S. Pat. No. 5,988,346, incorporated by reference herein.

Figure 2A:
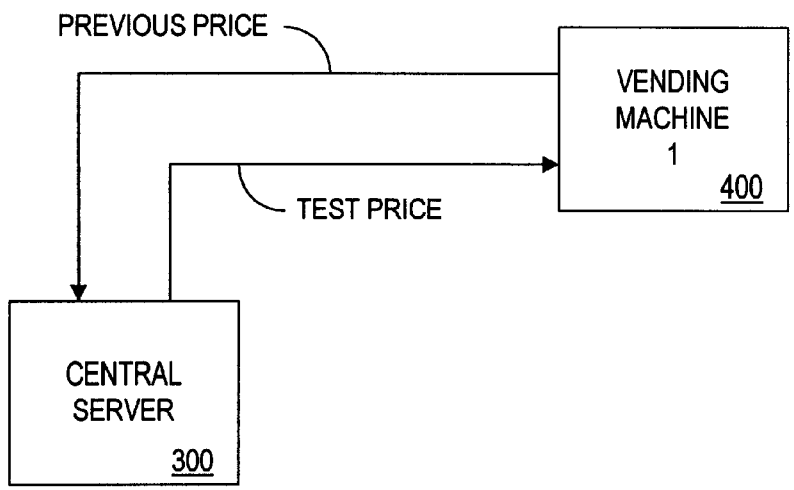
FIGS. 2A through 2C are schematic block diagrams illustrating the various stages of a progressive price adjustment evaluation process for the vending machine network environment of FIG. 1.
Figure 2B:
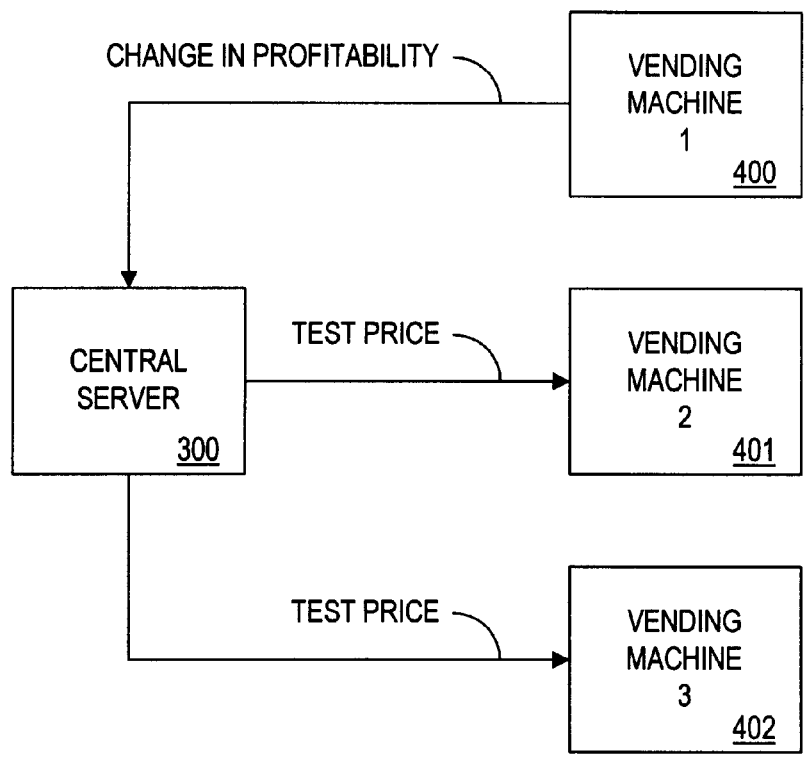

As discussed further below, and shown in FIG. 2A, the central server 300 initially adjusts the price of a product at a first vending machine 400, in order to evaluate a price adjustment. The central server 300 obtains the previous selling price from the vending machine 400 (or from information stored by the central server 300), calculates a new test price to be evaluated and communicates the new test price to the vending machine 400. After the price adjustment has been in place for a predefined trial period, the success of the price adjustment is evaluated to determine if the test price should be expanded beyond the initial vending machine 400. Depending on the performance of the price adjustment for the trial period, the price adjustment may be imposed on the same or a similar product in one or more additional vending machines 401–402, as shown in FIG. 2B, where the initial test process is repeated for the additional vending machines 401–402.

Figure 2C:
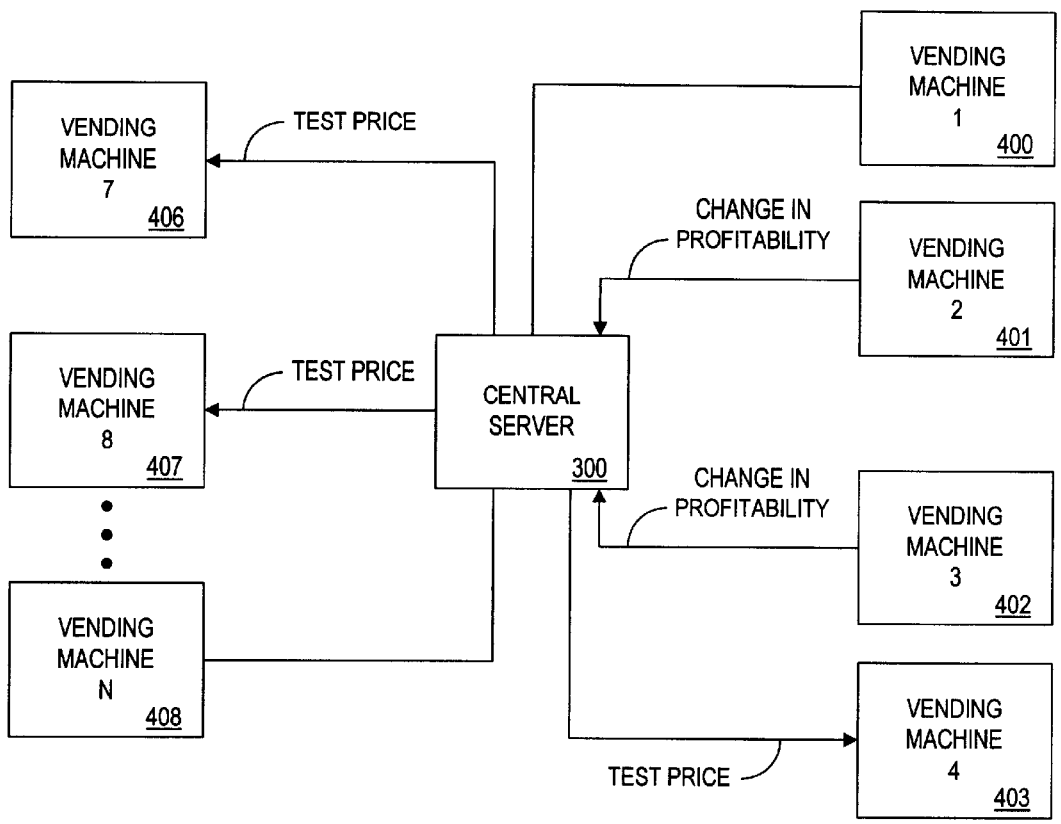

After the price adjustment has been in place with the second group of vending machines 401–402 for a further predefined trial period, the performance of the price adjustment is further evaluated to determine if the price adjustment should be applied to even more vending machines, such as vending machines 403, 406–408, as shown in FIG. 2C. In this manner, the vending machines 400–408 connected to the central server 300 can be configured in progressive "layers" of vending machines so that adjustments to price or other sales information can be initially evaluated by one or more vending machines in a small group, such as a first vending machine 400, before progressively expanding the new price or other sales information to one or more additional vending machines 401–408.

Figure 3:
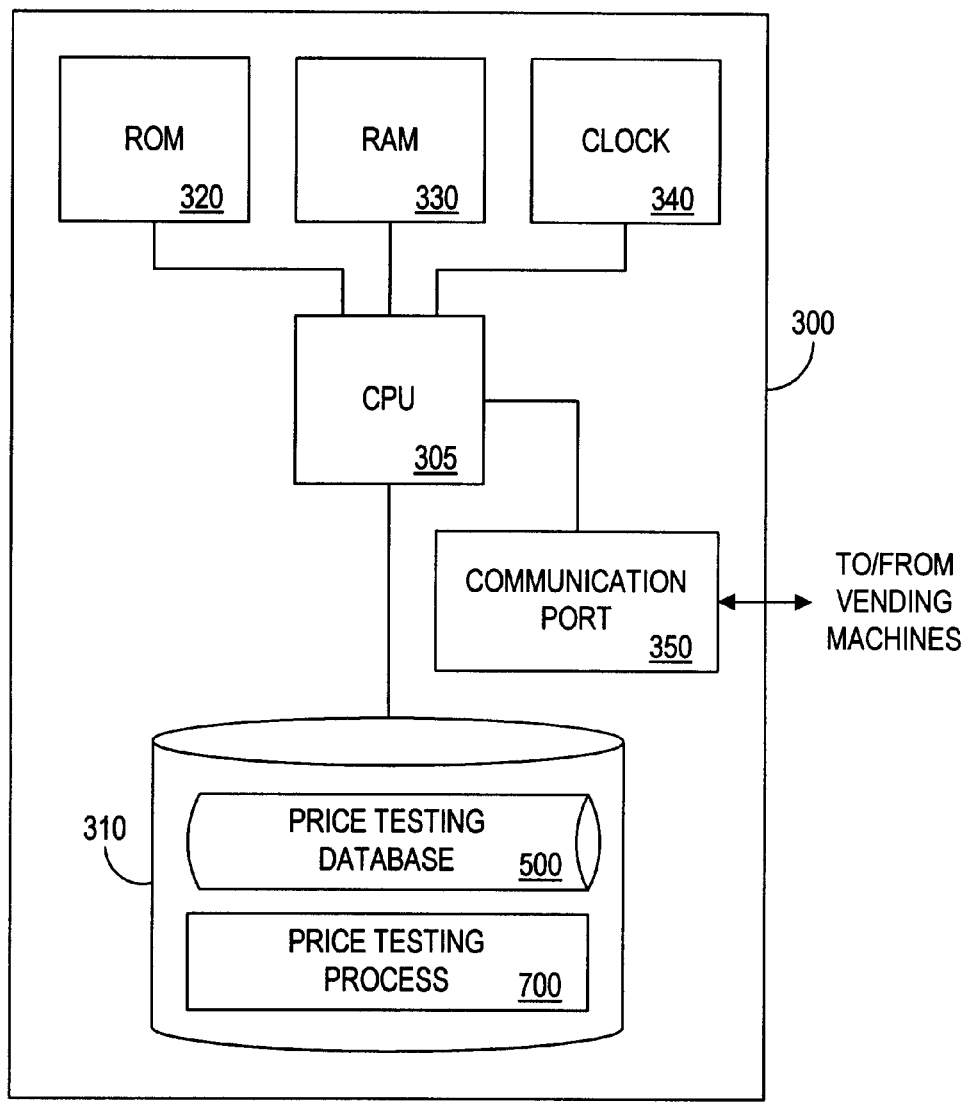
FIG. 3 is a schematic block diagram of the exemplary central server of FIG. 1.

FIG. 3 is a block diagram showing the architecture of an illustrative central server 300. The central server 300 may be embodied, for example, as an RS 6000 server, manufactured by IBM Corp., as modified herein to execute the functions and operations of the present invention. The central server 300 includes known hardware components, such as a central processing unit (CPU) 305 in communication with each of a data storage device 310, a read only memory (ROM) 320, a random access memory (RAM) 330, a clock 340, and a communications port 350. The CPU 305 can be in communication with the data storage device 310, the read only memory (ROM) 320, the random access memory (RAM) 330, the clock 340 and the communications port 350, either by means of a shared data bus, or dedicated connections, as shown in FIG. 3. The CPU 305 may be embodied as a single processor, or a number of processors.

As discussed further below in conjunction with FIGS. 5A and 5B, the data storage device 310 includes a price testing database 500. Generally, the price testing database 500 stores the magnitude, duration and predefined evaluation criteria for each progressive stage of a price adjustment. In addition, the data storage device 310 includes a price testing process 700, discussed further below in conjunction with FIGS. 7A and 7B, to implement the automatic testing, monitoring and management of vending machine price adjustments, in accordance with the present invention.

A communication port 350 connects the central server 300 to each of the vending machines 400–408, thereby permitting the central server 300 to communicate with each connected vending machine. The communication port 350 may include multiple communication channels for simultaneous connections. It is noted that the functionality provided by the central server 300, such as testing, monitoring and managing vending machine price adjustments, could be provided directly by one or more of the vending machines 400–408 or by a separate pricing controller (not shown), as would be apparent to a person of ordinary skill in the art.

Figure 4:
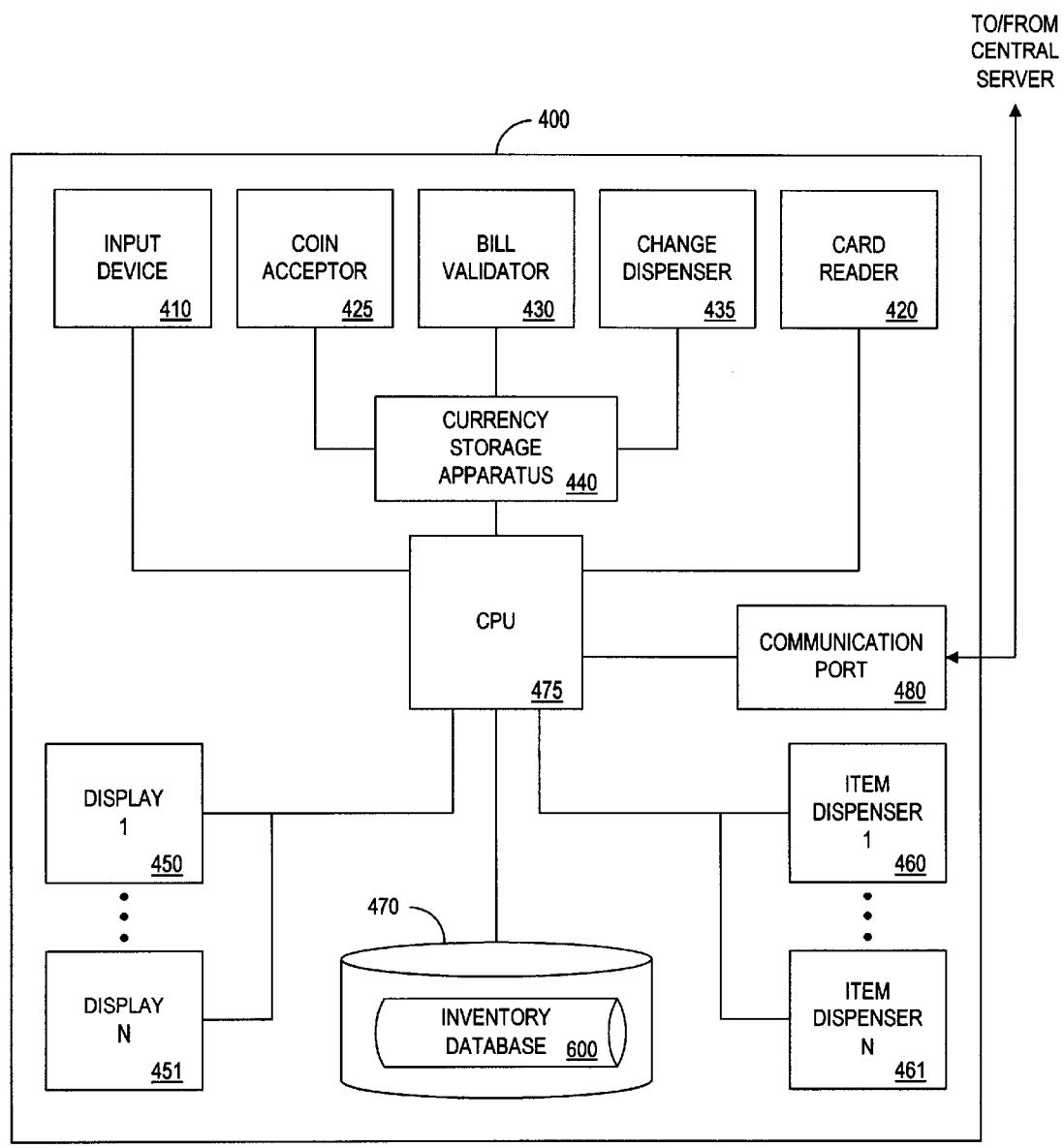
FIG. 4 is a schematic block diagram of an exemplary vending machine of FIG. 1.

FIG. 4 is a block diagram showing the architecture of an illustrative vending machine 400. The architecture illustrated in FIG. 4 is also descriptive of the functionality of the vending machines 401–408 shown in FIG. 1. As previously indicated, the vending machines 400–408 may be embodied as conventional hardware and software, as modified herein to carry out the functions and operations described below. For a detailed discussion of a suitable vending machine 400, see U.S. patent application Ser. No. 08/947,798, filed Oct. 9, 1997, the parent application to the present application, incorporated by reference herein. Another suitable conventional vending machine is Vendo model 392140004, commercially available from Vendo, Inc. of Fresno, Calif.

Generally, the vending machine 400 includes an input device 410 for receiving input from a customer including a product selection. Input device 410 may also be used for receiving input from an operator during stocking or maintenance of vending machine 400. The input device 410 may be embodied as a set of alpha-numeric keys, a selector dial, a set of buttons associated with a respective set of item dispensers, or any other conventional input device commonly employed by a vending machine designer.

In addition, a vending machine, such as vending machine 400, typically includes several mechanisms for receiving payment and dispensing change, including a card reader 420, a coin acceptor 425, a bill validator 430, and a change dispenser 435. The card reader 420 may be embodied as a conventional reader for reading data from a credit, debit or smart card, and it may cooperate with conventional remote point-of-sale credit card processing equipment (not shown) to validate credit based purchases through a conventional credit authorization network. Coin acceptor 425, bill validator 430, and change dispenser 435 communicate with a currency storage apparatus 440 and may each be conventional devices such as models AE-2400, MC5000 or TRC200, commercially available from Mars Electronics, Inc., of West Chester, Pa. or model 9300-L, commercially available from Coin Acceptors, Inc., of St. Louis, Mo. Coin acceptor 425 and bill validator 430 receive and validate currency that is stored by currency storage apparatus 440. Generally, card reader 420, coin acceptor 425, bill validator 430, and change dispenser 435 communicate with, and are controlled by, a CPU 475. A communication port 480 is provided for establishing communications between the vending machine 400 and the central server 300 via a network (not shown).

The CPU 475 also communicates with one or more item dispensers 460–461 and one or more displays 450-451 for presenting product information to customers. Displays 450–451 may be embodied, for example, as a liquid crystal display ("LCD") or a light emitting diode ("LED") display. Display 450–451 may provide a static message or a scrolling message so as to provide extensive product information using a relatively small display area. The CPU 475 may activate item dispensers 460–461 after a customer has purchased an item, causing the item to be transferred to a receptacle (not shown).

As shown in FIG. 4, the vending machine 400 also includes a data storage device 470. As discussed further below in conjunction with FIGS. 6A and 6B, the data storage device 470 includes an inventory database 600 that stores information on the available inventory, pricing and sales figures of each product sold by the respective vending machine 400 during the successive stages of a price adjustment evaluation.

Figure 5B:
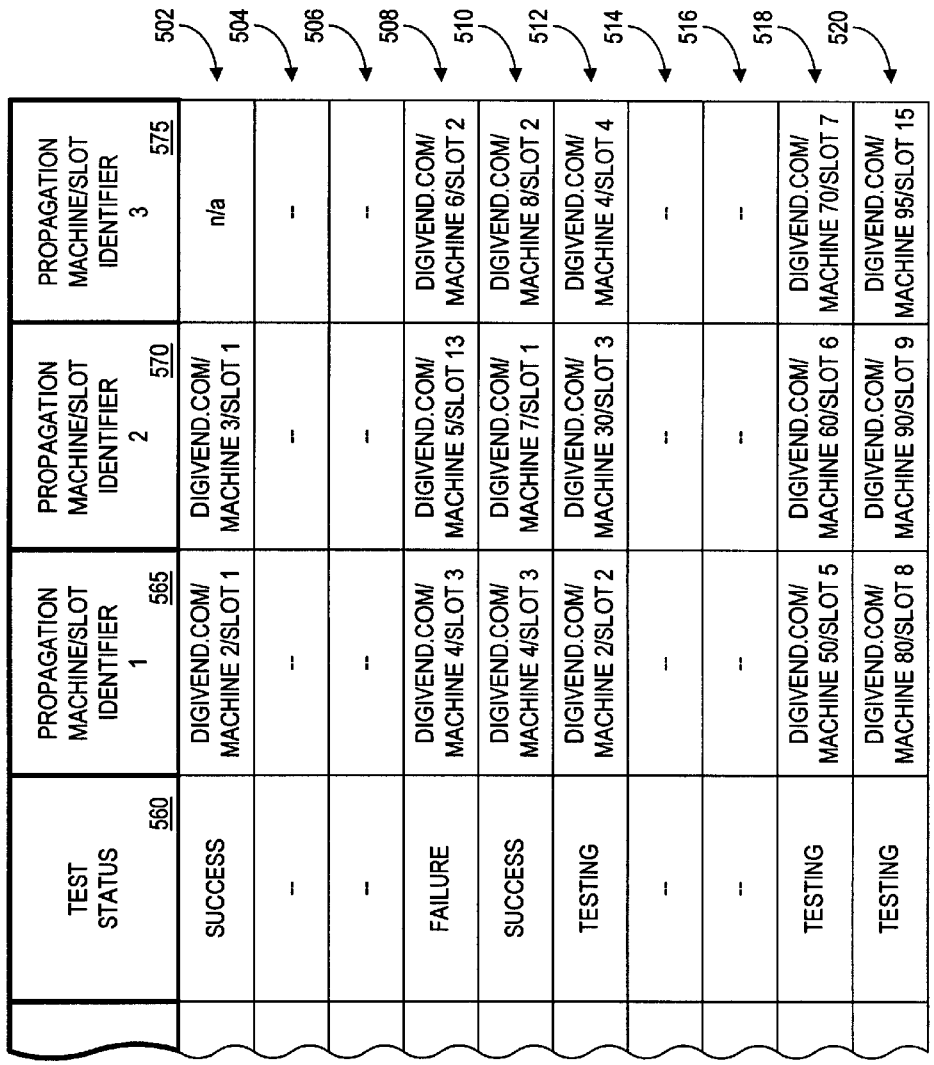

As previously indicated, the price testing database 500, shown in FIGS. 5A and 5B, stores the magnitude, duration and predefined evaluation criteria for each progressive stage of a price adjustment. The price testing database 500 maintains a plurality of records, such as records 502–520, each corresponding to a different item dispenser, or product, sold by means of the vending machines 400–408 connected to the central server 300. For each item dispenser, identified by a machine/slot identifier in field 530, the price testing database 500 includes a predefined price alteration factor in field 535 that indicates how to compute a test price. The predefined price alteration factor is applied to a previous price retrieved from the inventory database 600. For example, the price alteration factor in field 535 can be a predefined fixed monetary amount by which the price should be adjusted, as shown, for example, in record 502, or the price alteration factor can be a predefined percentage by which the price should be adjusted, as shown in record 504.

In addition, the price testing database 500 records the test start date and trial period duration in fields 540 and 545, respectively. In a further variation, the trial period duration or price alteration factor can be determined dynamically based on the degree of success or failure of a price adjustment. In this manner, a propagation rate or the price alteration factor may be proportionally more aggressive or conservative in accordance with the success or failure, respectively, of a test price.

The price testing database 500 records the predefined evaluation criteria or success determination criteria in field 550. The change in profitability over the trial period, and an indication of whether the price adjustment satisfied the predefined evaluation criteria are recorded in fields 555 and 560, respectively. Finally, the price testing database 500 stores a list of one or more additional vending machines 401–402 in fields 565 through 575 to be included in a subsequent propagation, if the price adjustment for the current trial period is successful. By increasing the number of vending machines included, the rate of propagation of successful price adjustments is increased. As shown in record 510 of the price testing database 500, since the price adjustment to machine 3 (402) was successful, the price adjustment will be automatically propagated to vending machines 4, 7 and 8 (403, 406, 407). It is noted that each vending machine and its associated item dispensers are identified in the illustrative embodiment using a Uniform Resource Locator (URL) format, typically associated with the World Wide Web (WWW) of the Internet. In this manner, a vending machine with a plurality of slots can be identified using a common file path nomenclature (company.com/file/subfile=company.com/machine/slot).

It is further noted that the list of additional vending machines 401–402 to be included in a subsequent propagation need not be predefined in an ordinal hierarchy, as shown in FIG. 5B. In an alternate embodiment, the additional vending machines 401–402 to be included in a subsequent stage can be based, for example, on geographical criteria or profitability criteria. A geographical propagation can be implemented by storing a geographic position identifier for each vending machine. For example, in embodiments where the network environment 100 comprises a telephone network, the geographic propagation can be implemented by using automatic number identifier (ANI) technology to determine the number associated with the vending machine. A profitability-based propagation can prevent the propagation of a new price to a vending machine that already meets predefined profitability criteria.

Figure 6A:
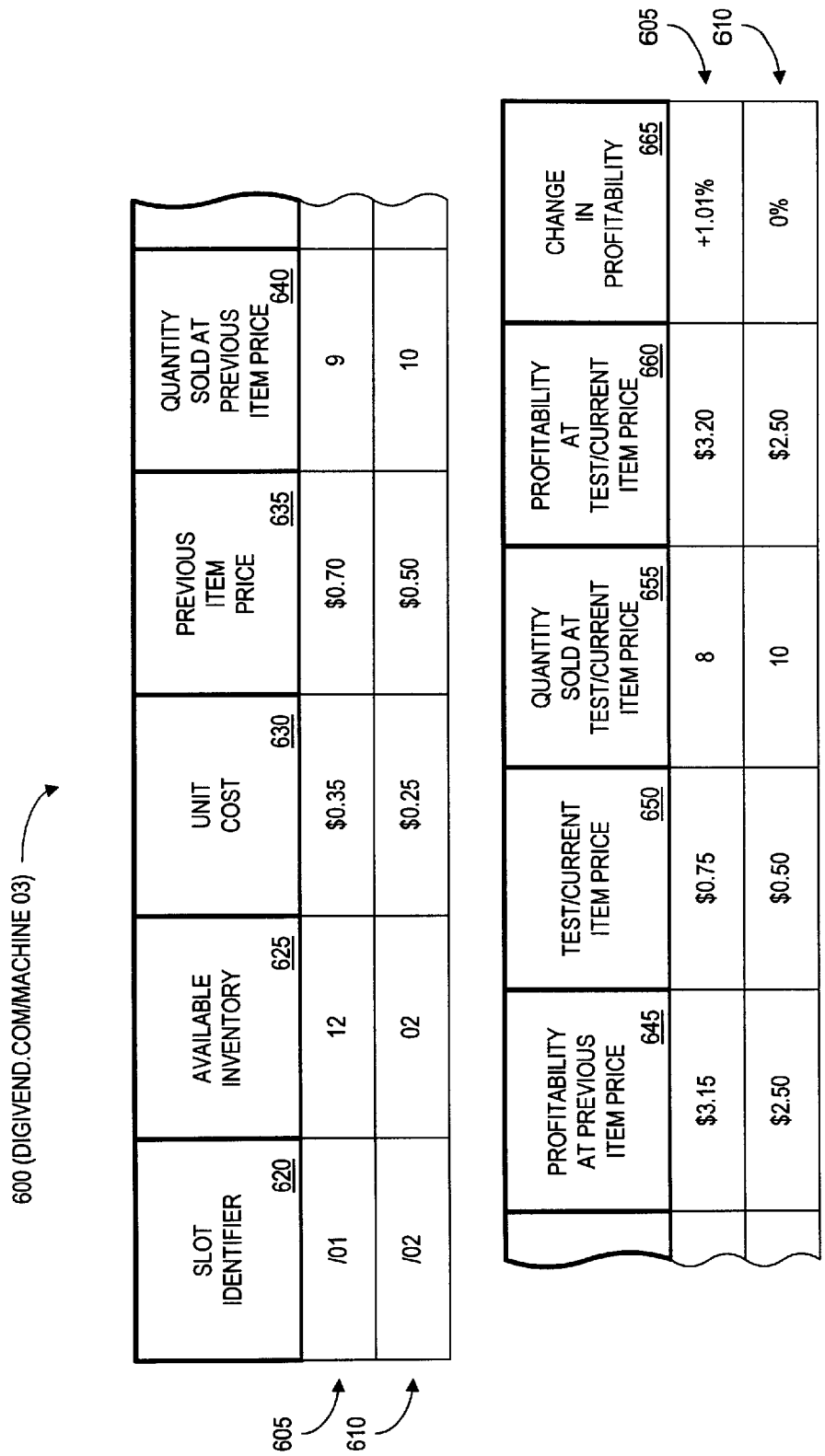

As previously indicated, the inventory database 600, shown in FIGS. 6A and 6B, stores information on the available inventory, pricing and sales figures of each product sold by a vending machine 400 during the successive stages of a price adjustment evaluation. FIGS. 6A and 6B each illustrate an inventory database 600 for different vending machines 400–408 in the network 100 of FIG. 1. As shown in FIGS. 6A and 6B, the inventory database 600 maintains a plurality of records, such as records 605–610, each corresponding to a different item dispenser, or product, on the respective vending machine 400–408. For each item dispenser, identified by a slot identifier in field 620, the inventory database 600 indicates the available inventory and unit cost in fields 625 and 630, respectively. The unit cost may be the cost of goods sold or the wholesale price. In addition, the inventory database 600 includes the price, quantity sold and profitability of each product at a previous item price in fields 635 through 645, respectively. The inventory database 600 also includes the price, quantity sold and profitability of each product at a current test price in fields 650 through 660, respectively. Finally, the inventory database 600 indicates the change in profitability between the current test price and the previous price, in field 665.

It is noted that the inventory database 600 shown in FIG. 6A corresponds to machine 3 (402) of FIG. 1 which has completed a price adjustment evaluation and determined that the price adjustment was a failure (record 510 of the price testing database 500 of FIGS. 5A and 5B), while the inventory database 600 shown in FIG. 6B corresponds to machine 7 (406) of FIG. 1 which has a price adjustment evaluation in progress (record 518 of the price testing database 500 of FIGS. 5A and 5B). Thus, the price, quantity sold and profitability of each product at a current test price in fields 650 through 660, respectively, of the inventory database 600 remains "to be determined."

Figure 7A:
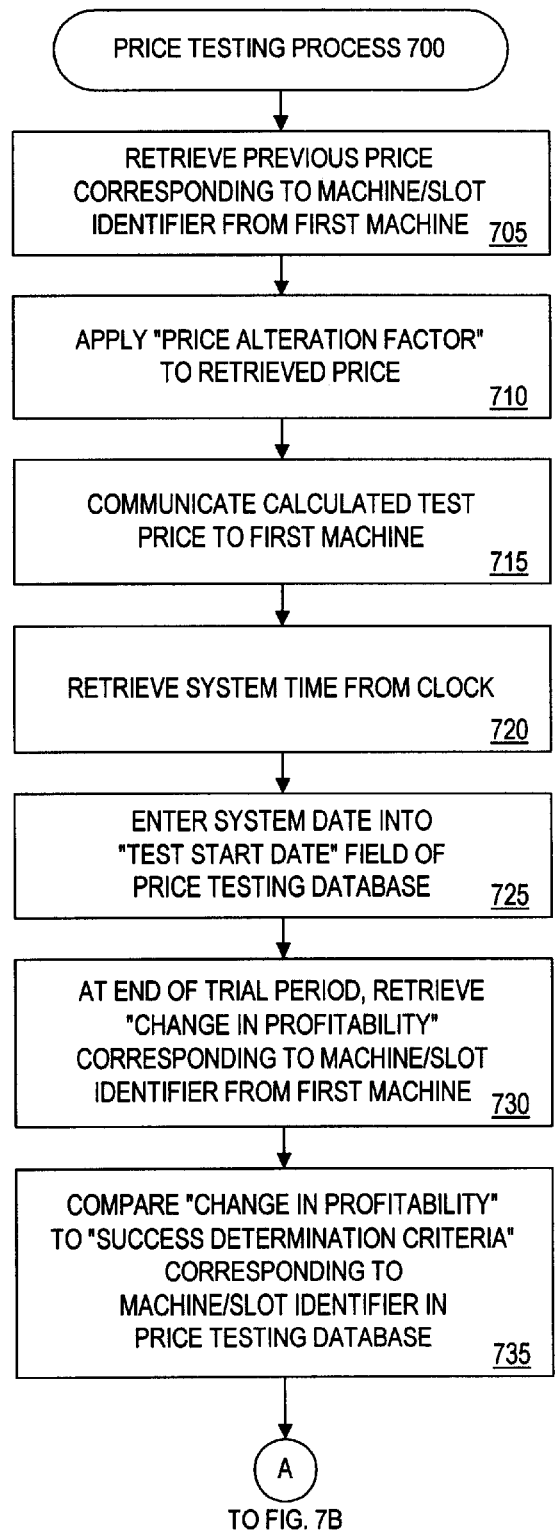
FIGS. 7A and 7B, collectively, are a flow chart describing an exemplary price testing process implemented by the central server of FIG. 3.
Figure 7B:
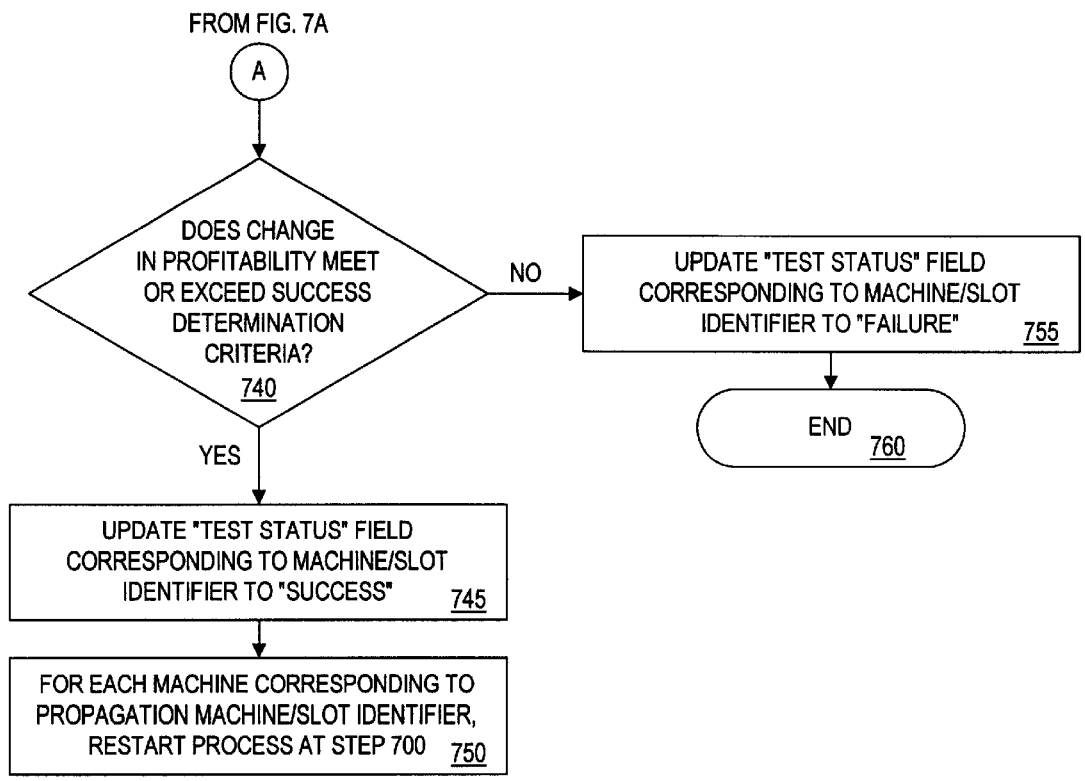

As previously indicated, a price testing process 700, shown in FIGS. 7A and 7B, implements the automatic testing, monitoring and management of vending machine price adjustments, in accordance with the present invention. The price testing process 700 initially retrieves the previous selling price from field 635 of database 600 for a given product, dispensed by an item dispenser on a first respective vending machine 400–408, during step 705. The first respective vending machine 400 is the first machine at which a price will be tested for a given product. The price alteration factor recorded for the product in field 535 of the price testing database 500 is applied to the retrieved previous price during step 710 to calculate the test price. The calculated test price is communicated to the vending machine 400 during step 715. The vending machine 400 stores the received price in the test/current item price field 650 of the inventory database 600 and communicates the test price to customers, for example, using a corresponding display 450.

The system date/time is retrieved from the system clock 340 during step 720 and is entered into the test start date field 540 of the price testing database 500 during step 725. Once the trial period has concluded, as detected during step 730, the change in profitability between the current test price and the previous price is retrieved from field 665 of the inventory database 600. It is noted that the date the trial period is over is determined by adding the trial period duration from field 545 to the start date/time. The predefined evaluation criteria is retrieved from the success determination criteria field 550 of the price testing database 500, and is compared to the change in profitability between the current test price and the previous price during step 735.

A test is performed during step 740 (FIG. 7B) to determine if the change in profitability meets or exceeds the success determination criteria. If it is determined during step 740 that the change in profitability does meet or exceed the success determination criteria, then the test status field 560 in the price testing database 500 is updated during step 745 to indicate that the price test was a success. Thereafter, for each machine identified in the list of one or more additional vending machines 401–408 in fields 565 through 575 of the price testing database 500 to be included in a subsequent stage, the price testing process 700 is repeated at step 750. In this manner, the successful test price is propagated to additional vending machines for further testing in the market.

If, however, it is determined during step 740 that the change in profitability does not meet or exceed the success determination criteria, then the test status field 560 in the price testing database 500 is updated during step 755 to indicate that the price test was a failure. Program control terminates during step 760.

It is to be understood that the embodiments and variations shown and described herein are merely illustrative of the principles of this invention and that various modifications may be implemented by those skilled in the art without departing from the scope and spirit of the invention.

We claim:

1. A method for automatically adjusting sales information associated with a product in a plurality of vending machines, the method comprising the steps of:
    determining an adjustment to said sales information;
    evaluating said sales information adjustment in at least one of said plurality of vending machines; and
    automatically propagating said sales information adjustment to at least one additional vending machine of said plurality of vending machines if said evaluating step determines said sales information adjustment meets predefined evaluation criteria.

2. The method of claim 1, wherein said sales information is a price of said product.

3. The method of claim 1, wherein said sales information is placement instructions for said product.

4. The method of claim 1, wherein said sales information is advertising instructions for said product.

5. The method of claim 1, wherein said sales information is packaging instructions for the sale of a group of products at a single price.

6. The method of claim 1, wherein said sales information is instructions for the subscription sale of said product.

7. The method of claim 1, wherein said at least one additional vending machine of said plurality of vending machines is predefined.

8. The method of claim 1, wherein said at least one additional vending machine of said plurality of vending machines is determined geographically.

9. The method of claim 1, wherein a trial duration period of said propagated adjustment is determined dynamically based on the degree of success of said change.

10. The method of claim 1, wherein a magnitude of said propagated adjustment is determined dynamically based on the degree of success of said change.

11. The method of claim 1, wherein said predefined evaluation criteria includes a minimum increase in profitability.

12. The method of claim 1, wherein said predefined evaluation criteria includes a minimum increase in revenue.

13. The method of claim 1, wherein said predefined evaluation criteria includes a minimum increase in sales.

14. The method of claim 1, further comprising the step of displaying said adjusted sales information at said vending machines.

15. The method of claim 1, wherein said sales information is a price and said step of determining said price includes the step of obtaining a current selling price and a price alteration factor and calculating said price based on said price alteration factor.

16. A method for automatically adjusting sales information associated with a product in a plurality of vending machines, the method comprising the steps of:
    accessing evaluation data obtained from at least one of said plurality of vending machines following an adjustment of said sales information;
    comparing said evaluation data to predefined evaluation criteria to determine whether to update said sales information for at least one additional vending machine of said plurality of vending machines; and
    automatically propagating said sales information adjustment to said at least one additional vending machine of said plurality of vending machines if said comparing step determines said sales information adjustment meets said predefined evaluation criteria.

17. The method of claim 16, wherein said sales information is a price of said product.

18. The method of claim 16, wherein said sales information is placement instructions for said product.

19. The method of claim 16, wherein said sales information is advertising instructions for said product.

20. The method of claim 16, wherein said sales information is packaging instructions for the sale of a group of products at a single price.

21. The method of claim 16, wherein said sales information is instructions for the subscription sale of said product.

22. The method of claim 16, wherein said predefined evaluation criteria includes a minimum increase in profitability.

23. The method of claim 16, wherein said predefined evaluation criteria includes a minimum increase in revenue.

24. The method of claim 16, wherein said predefined evaluation criteria includes a minimum increase in sales.

25. The method of claim 16, wherein said sales information is a price and said step of determining said price includes the step of obtaining a current selling price and a price alteration factor and calculating said price based on said price alteration factor.

26. A method for automatically adjusting sales information associated with a product in a plurality of vending machines, the method comprising the steps of:
    transmitting an adjustment to said sales information to at least one of said plurality of vending machines;
    receiving evaluation data from said at least one of said plurality of vending machines;
    comparing said evaluation data to predefined evaluation criteria to determine whether to update said sales information for at least one additional vending machine of said plurality of vending machines; and
    automatically propagating said sales information adjustment to said at least one additional vending machine of said plurality of vending machines if said evaluating step determines said sales information adjustment meets predefined evaluation criteria.

27. The method of claim 26, wherein said sales information is a price of said product.

28. The method of claim 26, wherein said sales information is placement instructions for said product.

29. The method of claim 26, wherein said sales information is advertising instructions for said product.

30. The method of claim 26, wherein said sales information is packaging instructions for the sale of a group of products at a single price.

31. The method of claim 26, wherein said sales information is instructions for the subscription sale of said product.

32. The method of claim 26, wherein said predefined evaluation criteria includes a minimum increase in profitability.

33. The method of claim 26, wherein said predefined evaluation criteria includes a minimum increase in revenue.

34. The method of claim 26, wherein said predefined evaluation criteria includes a minimum increase in sales.

35. The method of claim 26, wherein said sales information is a price and said step of determining said price includes the step of obtaining a current selling price and a price alteration factor and calculating said price based on said price alteration factor.

36. A vending machine controller for automatically adjusting sales information associated with a product in a plurality of vending machines, comprising:
   means for determining an adjustment to said sales information;
   means for evaluating said sales information adjustment in at least one of said plurality of vending machines; and
   means for automatically propagating said sales information adjustment to at least one additional vending machine of said plurality of vending machines if said evaluating step determines said sales information adjustment meets predefined evaluation criteria.

37. The vending machine controller of claim 36, wherein said sales information is a price of said product.

38. The vending machine controller of claim 36, wherein said sales information is placement instructions for said product.

39. The vending machine controller of claim 36, wherein said sales information is advertising instructions for said product.

40. The vending machine controller of claim 36, wherein said sales information is packaging instructions for the sale of a group of products at a single price.

41. The vending machine controller of claim 36, wherein said sales information is instructions for the subscription sale of said product.

42. The vending machine controller of claim 36, wherein said predefined evaluation criteria includes a minimum increase in profitability.

43. The vending machine controller of claim 36, wherein said predefined evaluation criteria includes a minimum increase in revenue.

44. The vending machine controller of claim 36, wherein said predefined evaluation criteria includes a minimum increase in sales.

45. The vending machine controller of claim 36, wherein said sales information is a price and said step of determining said price includes the step of obtaining a current selling price and a price alteration factor and calculating said price based on said price alteration factor.

46. A vending machine controller for automatically adjusting sales information associated with a product in a plurality of vending machines, comprising:
   a memory for storing said sales information for said product; and
   a processor operatively coupled to said memory, said processor configured to:
   determine an adjustment to said sales information;
   communicate said sales information adjustment to at least one of said plurality of vending machines;
   evaluate said sales information adjustment in said at least one of said plurality of vending machines; and
   automatically propagate said sales information adjustment to at least one additional vending machine of said plurality of vending machines if said sales information adjustment meets predefined evaluation criteria.

47. The vending machine controller of claim 46, wherein said sales information is a price of said product.

48. The vending machine controller of claim 46, wherein said sales information is placement instructions for said product.

49. The vending machine controller of claim 46, wherein said sales information is advertising instructions for said product.

50. The vending machine controller of claim 46, wherein said sales information is packaging instructions for the sale of a group of products at a single price.

51. The vending machine controller of claim 46, wherein said sales information is instructions for the subscription sale of said product.

52. The vending machine controller of claim 46, wherein said predefined evaluation criteria includes a minimum increase in profitability.

53. The vending machine controller of claim 46, wherein said predefined evaluation criteria includes a minimum increase in revenue.

54. The vending machine controller of claim 46, wherein said predefined evaluation criteria includes a minimum increase in sales.

55. The vending machine controller of claim 46, wherein said sales information is a price and said step of determining said price includes the step of obtaining a current selling price and a price alteration factor and calculating said price based on said price alteration factor.

56. A vending machine for automatically adjusting sales information associated with a product, comprising:
   a memory for storing sales information and corresponding sales figures for said product; and
   a processor operatively coupled to said memory, said processor configured to:
   record a change to said sales information in said memory, and to update said sales figures for each of said changes to said sales information;
   access said sales information and said corresponding sales figures after a predefined trial period following said change;
   provide said sales figures corresponding to said sales information before and after said change for comparison; and
   report an effect of said change on said sales figures to a central controller to determine whether said change should be propagated to one or more additional vending machines.

57. The vending machine of claim 56, wherein said sales information is a price of said product.

58. The vending machine of claim 56, wherein said sales information is placement instructions for said product.

59. The vending machine of claim 56, wherein said sales information is advertising instructions for said product.

60. The vending machine of claim 56, wherein said sales information is packaging instructions for the sale of a group of products at a single price.

61. The vending machine of claim 56, wherein said sales information is instructions for the subscription sale of said product.

62. The vending machine of claim 56, wherein said predefined evaluation criteria includes a minimum increase in profitability.

63. The vending machine of claim 56, wherein said predefined evaluation criteria includes a minimum increase in revenue.

64. The vending machine of claim 56, wherein said predefined evaluation criteria includes a minimum increase in sales.

65. The vending machine of claim 56, wherein said sales information is a price and said step of determining said price includes the step of obtaining a current selling price and a price alteration factor and calculating said price based on said price alteration factor.

66. An article of manufacture comprising:
a computer readable medium having computer readable program code means embodied thereon for controlling a plurality of vending machines, said computer readable program code means in said article of manufacture comprising:
computer readable program code means for determining an adjustment to sales information associated with a product in said plurality of vending machines;
computer readable program code means for evaluating said sales information adjustment in at least one of said plurality of vending machines; and
computer readable program code means for automatically propagating said sales information adjustment to at least one additional vending machine of said plurality of vending machines if said evaluation determines said sales information adjustment meets predefined evaluation criteria.

67. A method for automatically adjusting a price of a product in a plurality of vending machines, the method comprising the steps of:
determining a price for said product;
evaluating said price in at least one of said plurality of vending machines; and
automatically propagating said price to at least one additional vending machine of said plurality of vending machines if said evaluating step determines said price meets predefined evaluation criteria.

68. The method of claim 67, wherein said at least one additional vending machine of said plurality of vending machines is predefined.

69. The method of claim 67, wherein said at least one additional vending machine of said plurality of vending machines is determined geographically.

70. The method of claim 67, wherein a trial duration period of said propagated price adjustment is determined dynamically based on the degree of success of said change.

71. The method of claim 67, wherein a magnitude of said propagated price adjustment is determined dynamically based on the degree of success of said change.

72. The method of claim 67, wherein said predefined evaluation criteria includes a minimum increase in profitability.

73. The method of claim 67, wherein said predefined evaluation criteria includes a minimum increase in revenue.

74. The method of claim 67, wherein said predefined evaluation criteria includes a minimum increase in sales.

75. The method of claim 67, further comprising the step of displaying said adjusted price at said vending machines.

76. The method of claim 67, wherein said step of determining said price includes the step of obtaining a current selling price and a price alteration factor and calculating said price based on said price alteration factor.

77. A method for automatically adjusting a price of a product in a plurality of vending machines, the method comprising the steps of:
accessing evaluation data obtained from at least one of said plurality of vending machines following an adjustment of said price;
comparing said evaluation data to predefined evaluation criteria to determine whether to update said price for at least one additional vending machine of said plurality of vending machines; and
automatically propagating said price adjustment to said at least one additional vending machine of said plurality of vending machines if said comparing step determines said price adjustment meets said predefined evaluation criteria.

78. The method of claim 77, wherein said predefined evaluation criteria includes a minimum increase in profitability.

79. The method of claim 77, wherein said predefined evaluation criteria includes a minimum increase in revenue.

80. The method of claim 77, wherein said predefined evaluation criteria includes a minimum increase in sales.

81. The method of claim 77, wherein said step of determining said price includes the step of obtaining a current selling price and a price alteration factor and calculating said price based on said price alteration factor.

82. A method for automatically adjusting a price of a product in a plurality of vending machines, the method comprising the steps of:
transmitting an adjustment to said price to at least one of said plurality of vending machines;
receiving evaluation data from said at least one of said plurality of vending machines;
comparing said evaluation data to predefined evaluation criteria to determine whether to update said price for at least one additional vending machine of said plurality of vending machines; and
automatically propagating said price adjustment to said at least one additional vending machine of said plurality of vending machines if said evaluating step determines said price adjustment meets predefined evaluation criteria.

83. The method of claim 82, wherein said predefined evaluation criteria includes a minimum increase in profitability.

84. The method of claim 82, wherein said predefined evaluation criteria includes a minimum increase in revenue.

85. The method of claim 82, wherein said predefined evaluation criteria includes a minimum increase in sales.

86. The method of claim 82, wherein said step of determining said price includes the step of obtaining a current selling price and a price alteration factor and calculating said price based on said price alteration factor.

87. A vending machine controller for automatically adjusting a price of a product in a plurality of vending machines, comprising:
means for determining an adjustment to said price;
means for evaluating said price adjustment in at least one of said plurality of vending machines; and
means for automatically propagating said price adjustment to at least one additional vending machine of said plurality of vending machines if said evaluating step determines said price adjustment meets predefined evaluation criteria.

88. The vending machine controller of claim 87, wherein said predefined evaluation criteria includes a minimum increase in profitability.

89. The vending machine controller of claim 87, wherein said predefined evaluation criteria includes a minimum increase in revenue.

90. The vending machine controller of claim 87, wherein said predefined evaluation criteria includes a minimum increase in sales.

91. A vending machine controller for automatically adjusting a price of a product in a plurality of vending machines, comprising:

a memory for storing said price for said product; and a processor operatively coupled to said memory, said processor configured to:

determine an adjustment to said price;

communicate said price adjustment to at least one of said plurality of vending machines;

evaluate said price adjustment in said at least one of said plurality of vending machines; and automatically propagate said price adjustment to at least one additional vending machine of said plurality of vending machines if said price adjustment meets predefined evaluation criteria.

92. The vending machine controller of claim 91, wherein said predefined evaluation criteria includes a minimum increase in profitability.

93. The vending machine controller of claim 91, wherein said predefined evaluation criteria includes a minimum increase in revenue.

94. The vending machine controller of claim 91, wherein said predefined evaluation criteria includes a minimum increase in sales.

95. A vending machine for automatically adjusting a price associated with a product, comprising:

a memory for price information and corresponding sales figures for said product; and a processor operatively coupled to said memory, said processor configured to:

record a change to said price information in said memory, and to update said sales figures for each of said changes to said prices;

access said price information and said corresponding sales figures after a predefined trial period following said change;

obtain said sales figures corresponding to said price before and after said change for comparison; and report an effect of said change on said sales figures to a central controller to determine whether said price change should be propagated to at least one additional vending machine.

96. An article of manufacture comprising:

a computer readable medium having computer readable program code means embodied thereon for controlling a plurality of vending machines, said computer readable program code means in said article of manufacture comprising:

computer readable program code means for determining a price for a product;

computer readable program code means for evaluating said price in at least one of said plurality of vending machines; and computer readable program code means for automatically propagating said price to at least one additional vending machine of said plurality of vending machines if said evaluation determines said price meets predefined evaluation criteria.

97. A method for automatically adjusting sales information in a plurality of automated teller machines (ATMs), the method comprising the steps of:

determining an adjustment to said sales information;

evaluating said sales information adjustment in at least one of said plurality of automated teller machines; and automatically propagating said sales information adjustment to at least one additional automated teller machine of said plurality of automated teller machines if said evaluating step determines said sales information adjustment meets predefined evaluation criteria.

98. The method of claim 97, wherein said sales information is a surcharge fee charged for the use of said automated teller machine (ATM).

99. The method of claim 97, wherein said sales information is advertising instructions for display on said automated teller machine (ATM).

* * * * *